United States Patent
Hahn et al.

(10) Patent No.: US 7,693,327 B2
(45) Date of Patent: Apr. 6, 2010

(54) IMAGE RENDITION USING SEQUENTIAL COLOR RENDITION

(75) Inventors: Marko Hahn, Munich (DE); Günter Scheffler, Munich (DE); Christian Tuschen, Munich (DE); Peter Rieder, Munich (DE); Markus Schu, Erding (DE)

(73) Assignee: Trident Microsystems (Far East) Ltd., Grand Cayman (KY)

( * ) Notice: Subject to any disclaimer, the term of this patent is extended or adjusted under 35 U.S.C. 154(b) by 1142 days.

(21) Appl. No.: 11/254,546

(22) Filed: Oct. 20, 2005

(65) Prior Publication Data

US 2006/0092381 A1    May 4, 2006

(30) Foreign Application Priority Data

Oct. 20, 2004   (DE) .................. 10 2004 051 161

(51) Int. Cl.
     *G06K 9/00*   (2006.01)
(52) U.S. Cl. .............. 382/162; 348/413.1; 348/416.1; 348/268
(58) Field of Classification Search ............. 382/162
     See application file for complete search history.

(56) References Cited

U.S. PATENT DOCUMENTS

| 5,495,300 | A  | * | 2/1996  | de Haan et al. ............. 348/699 |
| 6,456,340 | B1 |   | 9/2002  | Margulis |
| 6,831,948 | B1 | * | 12/2004 | Van Dijk et al. ....... 375/240.12 |
| 2006/0146189 | A1 | * | 7/2006 | Riemens et al. ............. 348/453 |

FOREIGN PATENT DOCUMENTS

| WO | WO 2004/032523 | 4/2004 | ................ 9/31 |
| WO | WO 2004/073314 | 8/2004 | ................ 9/30 |
| WO | WO 2004/073315 | 8/2004 | ................ 9/30 |

OTHER PUBLICATIONS

Haan et al., "IC for Motion-Compensated 100 Hz TV With Natural-Motion Movie-Mode," IEEE Transaction on Consumer Electronics, IEEE Inc. New York, US, vol. 42, No. 2, May 1996, pp. 165-174.
Markandey et al. "Motion Adaptive Deinterlacer for DMD (Digital Micromirror Device) Based Digital Television", IEEE Transactions on Consumer Electronics, Aug. 1994, vol. 40, p. 735-742.
Schröder et al. "Mehrdimensionale Signalverarbeitung", vol. 2, p. 254-363., 2000.

* cited by examiner

*Primary Examiner*—Sath V Perungavoor
(74) *Attorney, Agent, or Firm*—DLA Piper LLP (US)

(57) ABSTRACT

The invention relates to a method for rendering an image sequence. wherein an individual image is rendered by rendering monochromatic subimages in temporal succession. A subimage sequence obtained by temporal sequencing of the subimages is generated in motion-compensated fashion.

7 Claims, 6 Drawing Sheets a)

b)

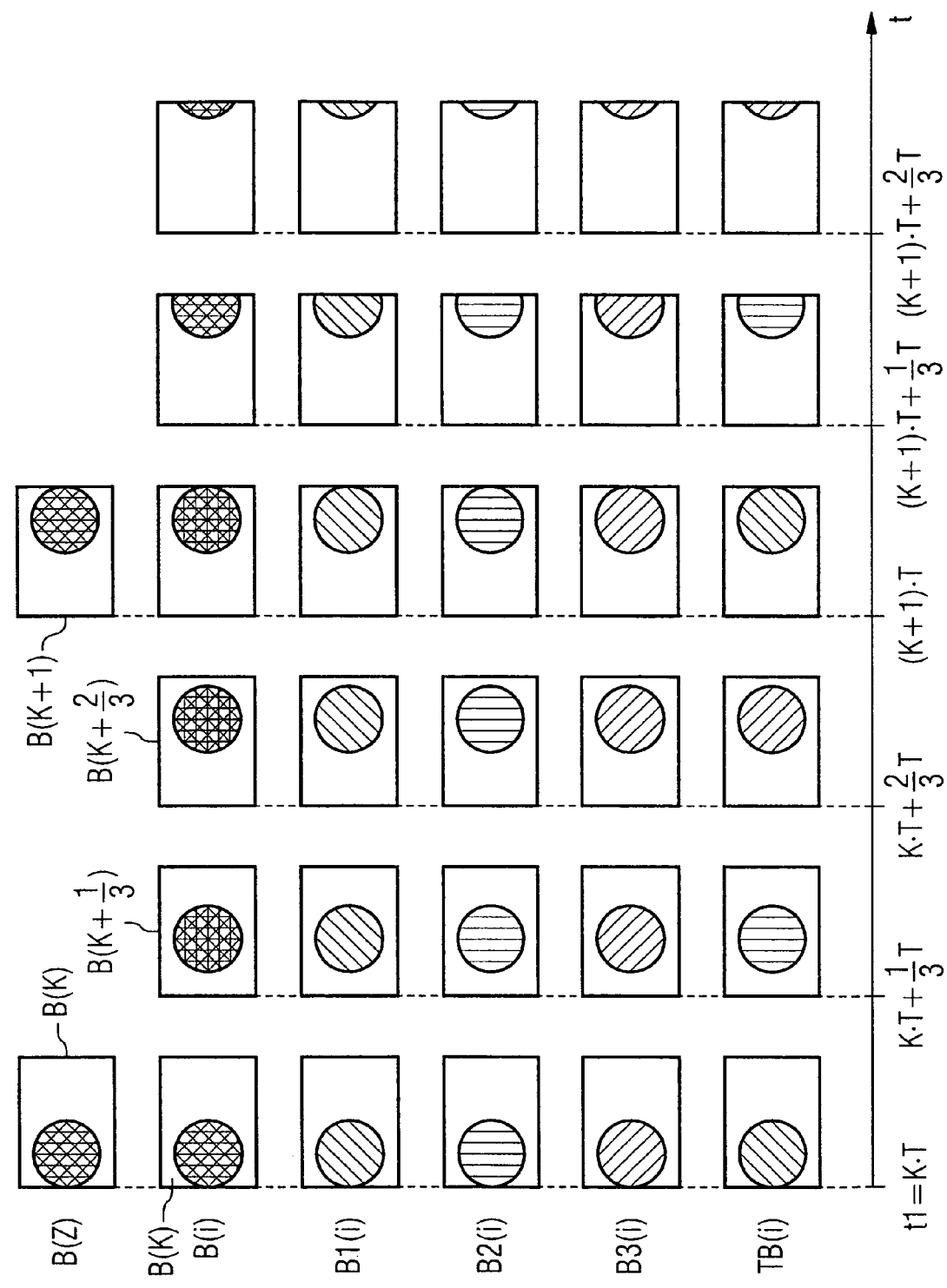

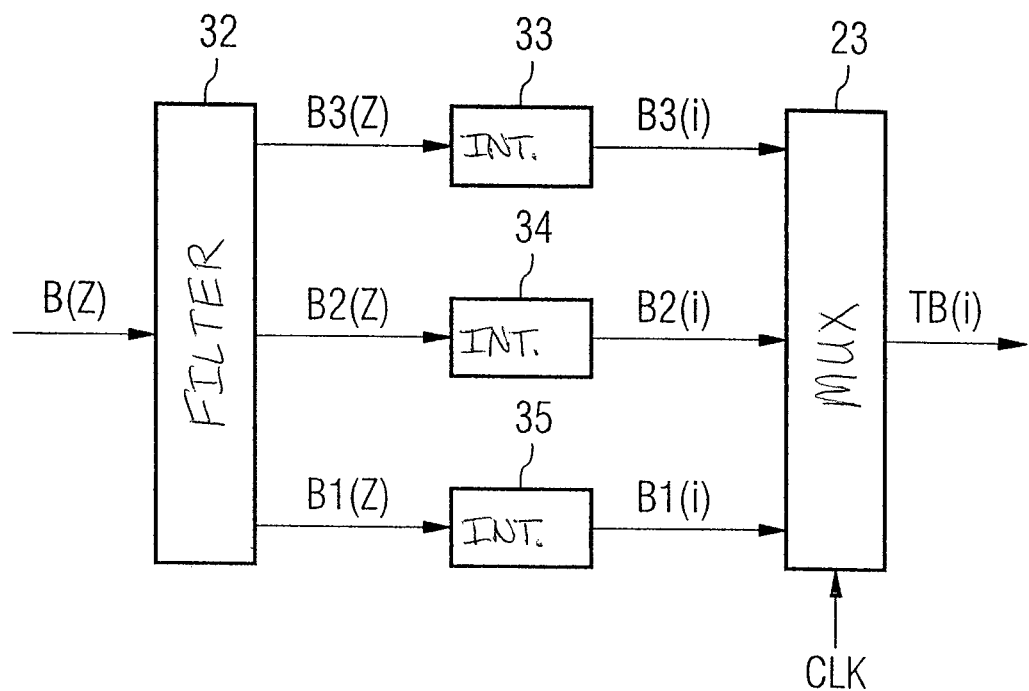

IMAGE RENDITION USING SEQUENTIAL COLOR RENDITION

PRIORITY INFORMATION

This patent application claims priority from German patent application 10 2004 051 161.6 filed Oct. 20, 2004, which is hereby incorporated by reference.

BACKGROUND OF THE INVENTION

The invention relates to a method and an apparatus for image rendition using sequential color rendition.

In image rendition with sequential color rendition, distinct color components of the image are rendered not simultaneously but in temporal succession, the rate at which the individual color components succeed one another being so high that the human eye "integrates" the individual color components into a color image.

Apparatuses that utilize such sequential color rendition are for example digital light processing projectors (DLP). Such projectors have a DLP integrated circuit that exhibits a matrix having a multiplicity of individually drivable mirrors. The DLP integrated circuit reflects a beam of light projected from the chip via optics onto a projection surface. The individual mirrors, in dependence on their position, each reflect a part of the incident beam toward the projection surface or away from the projection surface. The DLP integrated circuit is driven by a video signal, a light/dark pattern corresponding to the light/dark pattern of the image to be rendered being mapped onto the light beam reflected by the integrated circuit as a result of the separate driving of the individual mirrors. Lightness gradations can be achieved by virtue of the fact that the individual mirrors oscillate between the positions in which the light beam is reflected toward the projection surface or away from the projection surface.

For the optimal rendition of a color image, three DLP integrated circuits are required to reflect light in each of the three primary colors red, green and blue. The integrated circuits are each driven by a video signal that represents image components each having one of these colors. The monochromatic images generated by the individual integrated circuits are then superimposed by a prism into a polychromatic image.

Due to cost, a single DLP chip is often employed in DLP projectors. The rendition of a color image in this case can be generated by sequential color rendition as follows:

A color wheel, which is transparent by parts for red, green and blue components of a light source, is placed between the light source and the DLP integrated circuit and moved in such that red, green and blue light is cyclically reflected by the DLP integrated circuit. In synchronization with the motion of the color wheel, the DLP integrated circuit is driven by video signals that represent in each case the red, blue and green component of the image to be rendered. As a result, a succession of red, a green and a blue image are generated, and these images are integrated into one image through the physiology of human vision. The basic procedure for image rendition using sequential rendition of individual color components will be explained with reference to FIG. 1 and FIG. 2.

FIG. 1 illustrates two temporally successive images B(k), B(k+1) of an image sequence to be rendered. The images rendered in the example depict an object 10 that is in different positions in the successive images, that is, at a first image position in the first image B(k) and a second position, deviating from the first image position, in the second image B(k+1). If the image frequency is sufficiently high, the impression of a moving object arises as a result.

Suppose that the moving object 10 is a colored object that comprehends color components of all three primary colors, the individual color components possibly differing in intensity. A rendition of this object with the use of sequential color rendition is schematically illustrated in FIG. 2. Suppose the image frequency of the image sequence with images B(k), B(k+1) is f=1/T, T being the temporal interval between the beginning of the rendition of an image and the beginning of the rendition of a subsequent image. Within this duration T, in order to render one of the images B(k), B(k+1) of the image sequence, at least three subimages B1(k), B2(k), B3(k) or respectively B1(k+1), B2(k+1), B3(k+1) are rendered, of which a first subimage depicts the object in only a first color (e.g., in red), a second subimage depicts the object in only a second color (e.g., in green), and a third depicts the object in only a third color, (e.g., in blue). The color intensity of the monochromatic images here corresponds to the color intensity with which the respective color component is present in the color of the object.

The human eye then "blends" these three sequentially rendered subimages into an image that exhibits the colored object at the respective image position.

In the rendition of motion processes, (i.e., in the rendition of objects whose image position changes from image to image of the image sequence) the viewer can receive the impression—even in the case of monochromatic objects—that there are "color fringes" at the edges of the moving objects. The color fringes are especially distinct at the edges of the object that lie perpendicular to the direction of motion; in this connection one speaks of false-color rendition. This impression arises for the user even though the object is rendered at the same location in the image in the successive monochromatic subimages generated in order to render an image.

Therefore, there is a need for a system that renders an image sequence using sequential color rendition, in which the viewer's impression of false-color rendition is reduced.

SUMMARY OF THE INVENTION

In the method according to the invention for image rendition of an image sequence using sequential color rendition, in which an individual image is thus rendered by rendering monochromatic subimages in temporal succession, the subimage sequence is motion-compensated. Here "subimage sequence" means the temporal succession of monochromatic subimages, the color of temporally successive subimages changing cyclically.

When a moving object is rendered by image rendition methods with sequential color rendition, ideally there should be no color fringes at the edges of the object because the object is rendered "in register" at the same location in the individual subimages generated in order to render an image. These color fringes perceived by a viewer are caused by the physiology of human vision. Human perception detects continuous motion of an object in an image sequence if the image frequency is higher than about 60 Hz. In the case of images with moving content, perception follows an imagined line connecting the positions in the individual images of the object rendered as moving. In sequential color rendition, the physiology of vision is obviously capable—even in the case of high image frequencies and correspondingly higher subimage frequencies—of detecting that an object is being rendered by monochromatic renditions of the object in temporal succession.

When a static object is rendered (i.e., one that is not moving) the individual color components rendered in temporal succession are blended in such fashion that this sequential color rendition is not perceived.

When moving objects are rendered, the brain anticipates the position of the moving object in the temporally successive monochromatic subimages and expects the monochromatic object in successive subimages to be rendered at different positions, which depend on the direction of motion and the speed of motion of the object. However, because the position of the object is unchanged in the subimages rendered in temporal succession in order to render an individual image, the impression arises of a difference image between the expected rendition and the image actually rendered.

This presumed difference between the rendition expected by the human brain and the actual rendition can be avoided with the system of the invention, in which the subimage sequence is generated and rendered in motion-compensated fashion.

The motion-compensated subimage sequence can be generated for example by generating, from the image sequence to be rendered, a motion-compensated image sequence having a higher frequency, this higher frequency corresponding to the frequency at which the individual monochromatic subimages are rendered in temporal succession. From this motion-compensated image sequence, the subimage sequence is then generated with monochromatic subimages whose color alternates cyclically.

Furthermore, the image sequence may be split to be rendered into three monochromatic subimage sequences and, from these subimage sequences, to generate motion-compensated subimage sequences from which the subimage sequence produced for rendition is generated with successive subimages whose color alternates cyclically.

Methods have been known heretofore for generating a motion-compensated image sequence from an existing image sequence, the motion-compensated image sequence having a higher image frequency than the existing image sequence, and for this reason these methods will be briefly explained in what follows with reference only to the basic mode of functioning.

In these methods, intermediate images are interpolated for two successive images of the existing image sequence, so-called motion estimation being performed for the purpose of intermediate image interpolation in order to identify moving objects in the image sequence and determine their "motion vector." Such methods of motion estimation are described for example in Chapter 8 of Schröder, H., and H. Blume, *Mehrdimensionale Signalverarbeitung* [Multidimensional Signal Processing], Vol. 2, Teubner Verlag, 2000, ISBN 3-519-06197-X. This motion information being known, intermediate images can be interpolated that lie temporally at an arbitrary position between two images of the existing image sequence and in which objects rendered as moving are rendered at positions dependent on the previously determined motion information and the temporal position of the intermediate image between the existing images.

If for example the intermediate image lies temporally at the midpoint between two successive images of the existing image sequence, then an object located at a first position in a first image of the existing image sequence and at a second position in a subsequent second image is rendered in the intermediate image at the midpoint between the first position and the second position, in order to obtain a rendition correct in respect of motion.

Methods for generating a motion-compensated image sequence from an existing image sequence are employed for example in so-called 100 Hz up-conversion (compare Schröder and Blume, ibid., Section 9.4.2), in which image sequences having an image frequency of 50 Hz are converted to an image sequence having an image frequency of 100 Hz, or in the generation of "artificial slow-motion" image sequences.

These and other objects, features and advantages of the present invention will become more apparent in light of the following detailed description of preferred embodiments thereof, as illustrated in the accompanying drawings.

BRIEF DESCRIPTION OF THE DRAWINGS

FIG. 7 illustrates by way of example the image sequences generated in the apparatus of FIG. 5; and FIG. 8 illustrates a further exemplary embodiment of an apparatus according to an aspect of the invention.

DETAILED DESCRIPTION OF THE INVENTION

Figure 1:
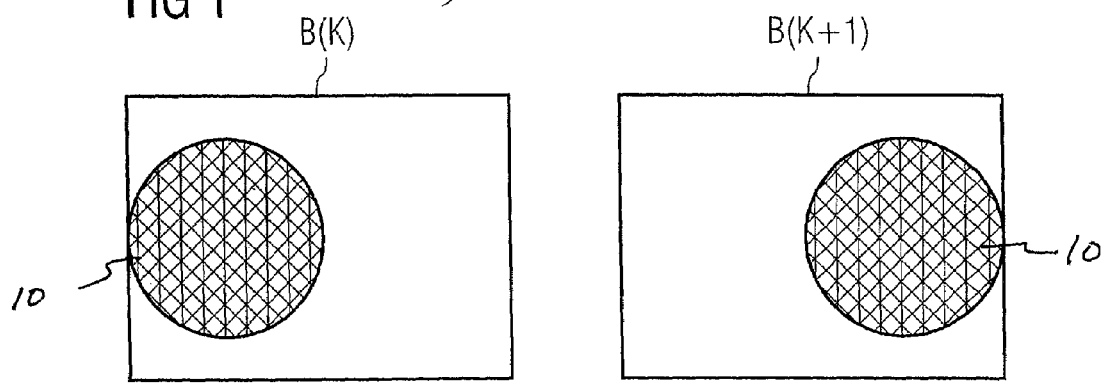
FIG. 1 illustrates two temporally successive images of an image sequence depicting a moving object.
Figure 2:
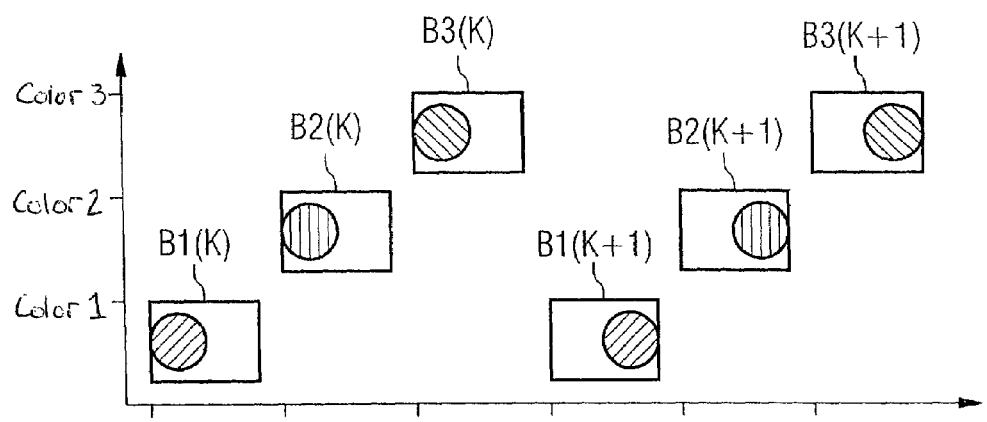
FIG. 2 illustrates a rendering of the image sequence of FIG. 1 using sequential color rendition.
Figure 3:
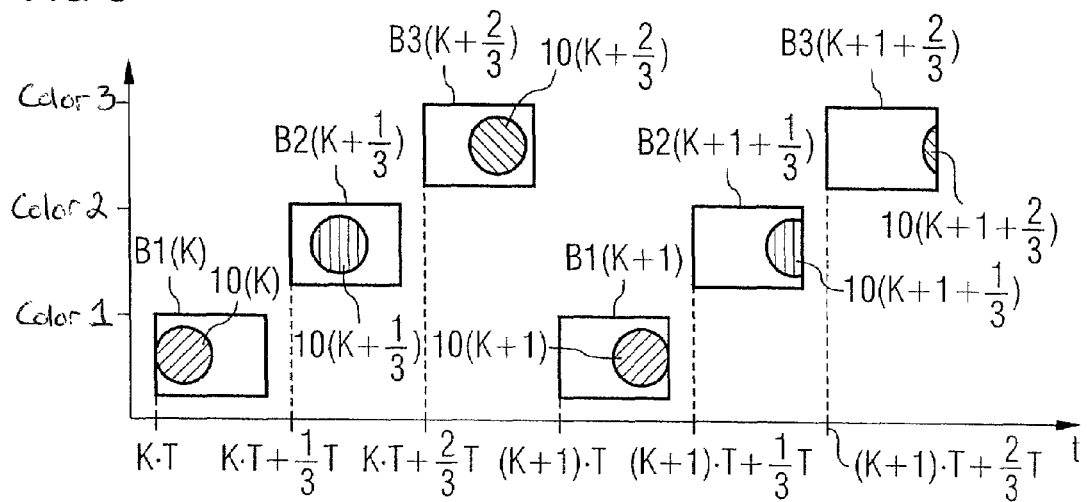
FIG. 3 illustrates a rendering the image sequence of FIG. 1 using sequential color rendition.

FIG. 3 illustrates a subimage sequence generated in order to render images B(k), B(k+1) of the image sequence of FIG. 1 using sequential color rendition. In this example, it is assumed that the individual images can be rendered by three monochromatic subimages, for example subimages in the colors red, green and blue, so that in order to render an image three monochromatic subimages are rendered in temporal succession. Immediately successive subimages differ in color, and in FIG. 3, distinct rendition planes are chosen for the individual colors in the direction perpendicular to the time axis. In order to characterize distinct colors in the black-and-white representation of FIG. 3, distinct hatching patterns are chosen for the individual colors.

In FIG. 3, B1(i) denotes the subimages of the subimage sequence in the first color, for example red; B2(i) denotes the subimages of the second color, for example blue; and B3(i) denotes the subimages of the third color, for example green.

The subimage sequence is motion-compensated, which is equivalent to the fact that moving objects rendered by the subimage sequence are rendered correctly in respect of motion at the temporal position of the respective subimage in the subimage sequence. The position of a moving object, that is, an object that has a first position in a first image B(k) of the rendered image sequence and a second position different from the first position in a subsequent second image B(k+1) of the image sequence, changes from subimage to subimage in the direction of motion.

In the example of FIG. 1, the direction of motion of the object 10 runs in the horizontal direction of the image from the left image margin to the right image margin. Correspondingly, the position of the object in the subimage sequence changes from subimage to subimage in the direction toward the right image margin. The subimage sequence in the illustrated example is generated in such fashion that the position of the object 10 in subimages B1(k), B1(k+1) of the first color corresponds to the position of the object in images B(k), B(k+1) of the image sequence to be rendered. The subimages of the second color and the third color, respectively B2(k), B3(k) and B2(k+1), B3(k+1), lying temporally between subimages B1(k), B1(k+1) of the first color are subimages interpolated in motion-compensated fashion.

Figure 4:
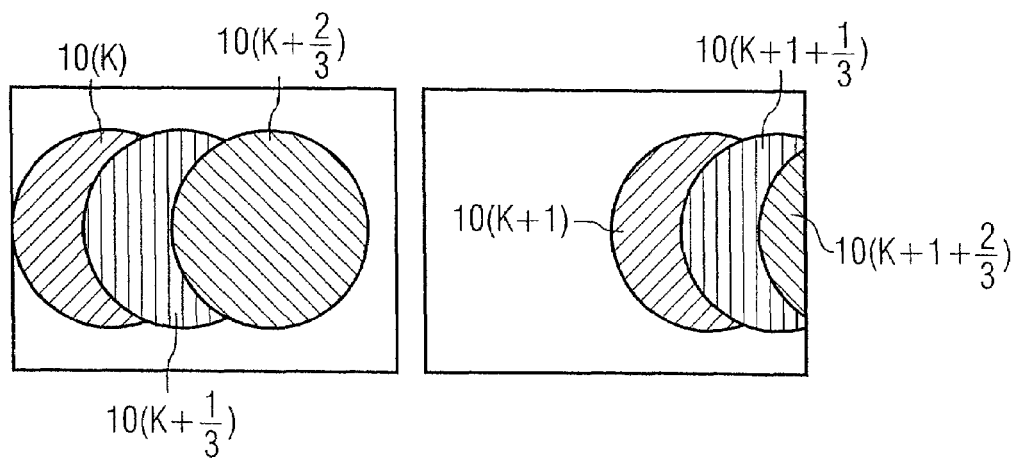
FIG. 4 illustrates the positions of the monochromatically rendered superimposed objects in one image in each case.

Referring to FIG. 4, the content of the three monochromatic subimages, respectively B1(k), B2(k+⅓), B3(k+⅔) and B1(k+1), B2(k+1+⅓), B3(k+1+⅔), which are generated in association with an image B(k) and B(k+1) respectively, are rendered in superimposed fashion in one image. As can be seen, the outlines of the objects, each monochromatic, of the individual subimages are not in register because of the generation of a motion-compensated subimage sequence, 10(k), . . . , 10(k+1+⅔) denoting the objects in the individual subimages of the subimage sequence. The outlines of the monochromatic objects instead lie offset relative to one another along the direction of motion of the object. When the physiology of human vision is taken into consideration, however, this offset of the position of the objects, each rendered monochromatically, from subimage to subimage leads to the object rendered by the subimage sequence being perceived as an object in a uniform color, without interfering color fringes being perceived at the edges of the object. The color of the object results from blending of the colors of the objects in the three monochromatic subimages.

Figure 5:
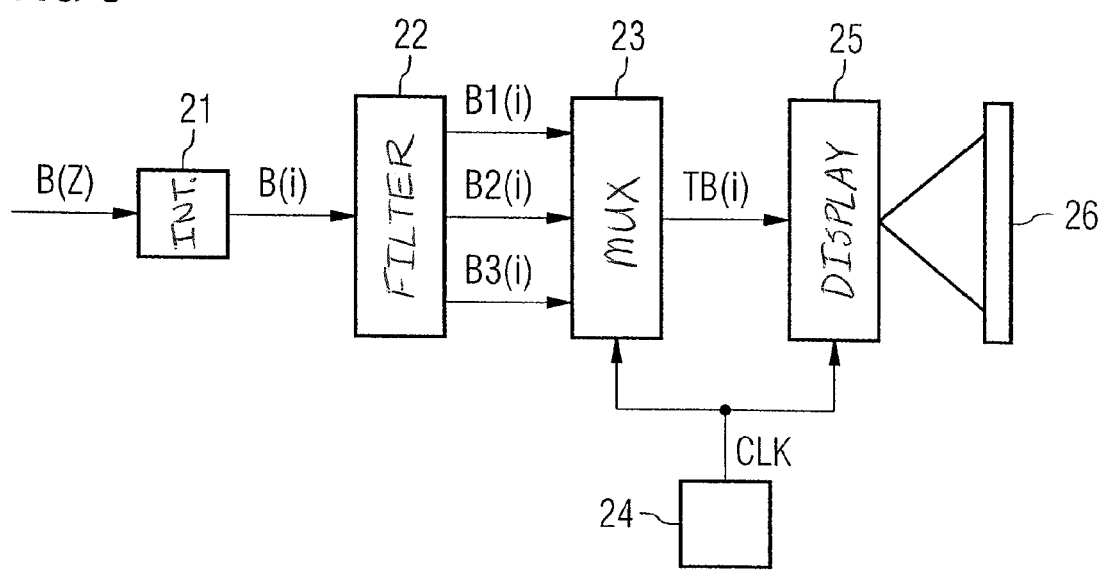
FIG. 5 illustrates a first embodiment of a system for image rendition which comprises a signal processing apparatus and a display.

FIG. 5 illustrates a first embodiment of a system for image rendition using a subimage sequence with monochromatic subimages whose color varies cyclically. B(z) denotes an image sequence to be rendered, which can be a conventional video image sequence and, indeed, both a frame sequence with line-interlaced frames and a full-image sequence. The image frequency at which individual images of this image sequence B(z) are available is f=1/T.

Two temporally successive images B(k), B(k+1) of this image sequence B(z), which in the example correspond to the images rendered in FIG. 1 with a moving round object, are illustrated in FIG. 7. Here t1=k·T denotes a first time point t1 at which a first image B(k) of this image sequence is available, and t2=(k+1)·T denotes a second time point at which second image B(k+1) of this image sequence is available.

Figure 6:
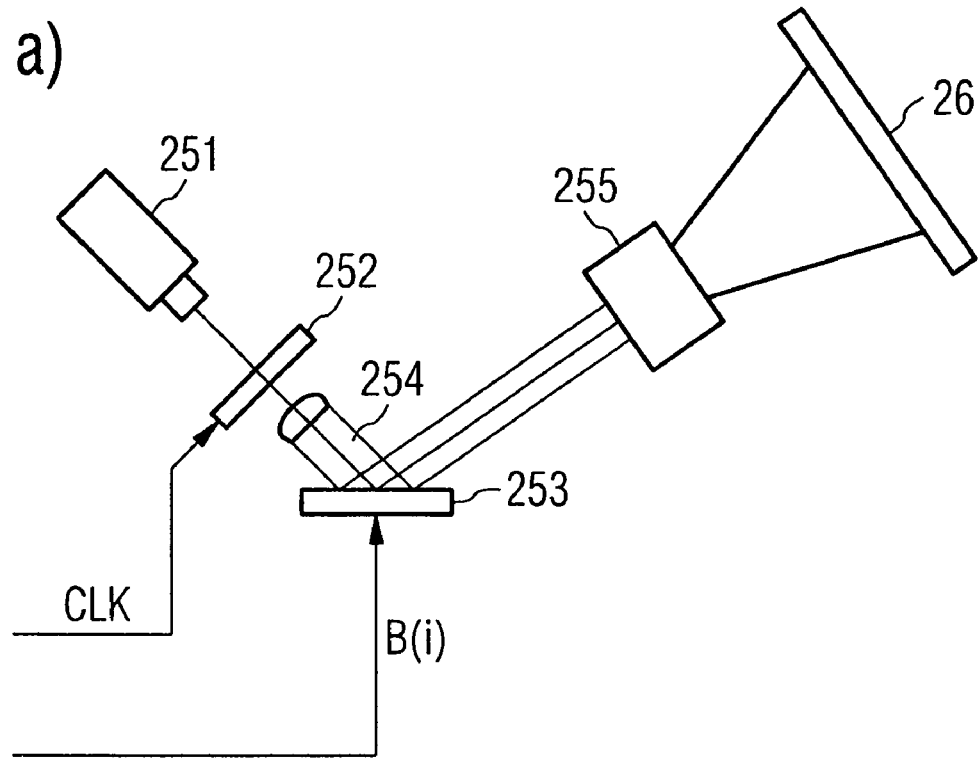
FIG. 6 illustrates an example for the display of the apparatus of FIG. 5.
Figure 6:
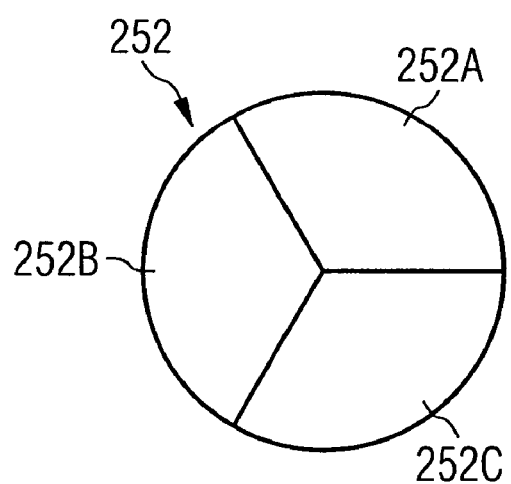

The input image sequence B(z) is supplied to an interpolator 21 that generates from motion-compensated intermediate image interpolation, an image sequence B(i) having an image frequency three times that of the input image sequence B(z). The motion-compensated image sequence B(i) is illustrated in FIG. 6.

With reference to FIG. 7, the interpolator 21 generates in motion-compensated fashion, for two temporally successive images B(k), B(k+1) of the input image sequence B(z), two intermediate images B(k+⅓) and B(k+⅔). The image sequence B(i) thus comprises the images of the input image sequence B(z) as well as two additional motion-compensated intermediate images for each image of the input image sequence. The individual images of this motion-compensated image sequence B(i) are preferably uniformly spaced in respect of time. The temporal interval of the two intermediate images B(k+⅓), B(k+⅔) associated with images B(k), B(z+1) of input image sequence B(z) is taken into account in previously known fashion in intermediate image interpolation. In relation to the illustrated example in which the object is located at a first position in the first image B(k) and at a second position in the second image B(k+1), this means that the position of the object in first intermediate image B(k+⅓), which is rendered at a time point t1+⅓·T, is offset relative to the position in the image B(k) by ⅓ of the distance between the first image position and the second image position. In the further interpolated intermediate image B(k+⅔), which is rendered at a time point t1+⅔·T, the object is located at a position that is offset relative to the position in the image B(k) by ⅔ of the distance between the first position and the second position in the direction of motion.

Apparatuses for motion-compensated intermediate image interpolation corresponding to the interpolator 21 are well known, and shall not be discussed in detail herein, in the interest of brevity. For example, such an interpolator is described for example in Schröder and Blume, ibid., pages 315-363.

The motion-compensated image sequence B(i) is supplied to a filter 22, which splits the image sequence B(i) into monochromatic image sequences B(i), B2(i), B3(i). From these monochromatic motion-compensated subimage sequences B1(i), B2(i), B3(i), subimage sequence TB(i) produced for rendition is formed by a multiplexer 23. The subimage sequence TB(i) represents the respective temporally successive subimages of distinct colors. The multiplexer 23 passes cyclically, in time with a clock signal CLK via a clock 24 whose frequency corresponds to the frequency of the motion-compensated image sequence B(i), one of the three subimage sequences B1(i), B2(i), B3(i) to its output in order to generate subimage sequence B(i) to be rendered.

The subimage sequence TB(i) is supplied to a display 25, for example a so-called DLP processor, which projects onto a projection screen 26 the images represented by the subimage sequence TB(i).

FIG. 6A is a simplified schematic illustration of a DLP projector, which has as its central element a DLP integrated circuit 253 to which the subimage signal TB(i) is supplied. The DLP integrated circuit is fashioned to reflect selectively at its surface, as dictated by the subimage signal TB(i), a light beam delivered from a light source 251 and propagated through an optical system 254 in order to generate a reflected light beam having a light/dark pattern dependent on the subimage signal TB(i). The light beam reflected from the DLP integrated circuit 253 is received by a projection apparatus 255 and projected onto projection screen 26. A color wheel 252, which is inserted into the beam path between the light source 251 and the DLP integrated circuit 253, and which has three distinct color filter regions 252A, 252B, 252C as shown in FIG. 6B, rotates in synchronization with clock signal CLK. In this way a light beam is generated in synchronization with the subimages represented by the subimage signal TB(i) and containing in each case only the video information for one color component of the image, which light beam is reflected by the DLP integrated circuit.

With reference to FIG. 8, it is also possible to split the incoming image signal B(z) before a motion-compensated image sequence is generated, using a filter 32 corresponding to the filter 22 (FIG. 5), in order to generate three subimage sequences or subimage signals B1(z), B2(z), B3(z). The system of FIG. 8 comprises three intermediate image interpolators 33, 34, 35 that, from monochromatic image sequences B1(z), . . . , B3(z), generate motion-compensated subimage sequences B1(i), . . . , B3(i) having a frequency three times that of input image sequence B(z). In the manner already explained with reference to FIG. 5, these subimage sequences are supplied to the multiplexer 23 and further processed.

The subimage sequences to be processed are thus first broken down into their color components before motion compensation takes place. Next the motion-compensated color subimages are sequentially passed through to the device to the display. As described, the color component currently being passed through must correspond to the filter currently located in the optical beam path.

In each of the systems of FIG. 5 and FIG. 8, more subimages are generated than are necessary for the subimage sequence TB(i), which ultimately serves for image rendition. It should be pointed out that the intermediate image interpolators 33, 34 and 35 of FIG. 8 can also be fashioned such that these generate, by suitable intermediate image interpolation from monochromatic subimage sequences B1(z), ..., B3(z), only the monochromatic subimages that are necessary for the subimage sequence TB(i).

The frequency of image rendition can also be a (possibly not whole-number) multiple of the input image frequency. In this case the color wheel rotates more than once per input image or has more than three subdivisions.

Although the present invention has been illustrated and described with respect to several preferred embodiments thereof, various changes, omissions and additions to the form and detail thereof, may be made therein, without departing from the spirit and scope of the invention.

What is claimed is:

1. A method for rendering an image sequence (B(z)) in which an individual image (B(k), B(k+1)) is rendered by rendering monochromatic subimages (B1(k),..., B3(k+1)) in temporal succession, wherein a subimage sequence (TB(i)) obtained by temporal sequencing of subimages is generated in motion-compensated fashion, the method comprising:
   generating a motion-compensated image sequence (B(i)) having an image frequency higher than that of the image sequence (B(z)) to be rendered;
   filtering the motion-compensated image sequence (B(i)) with a color filter apparatus in order to obtain at least three monochromatic subimage sequences (B1(i), B2(i), B3(i); and
   generating a subimage sequence (TB(i)) to be rendered from the individual subimage sequences (B1(i), B2(i), B3(i)) by cyclic selection of images of the subimage sequences by a time-multiplexing method;
   where the generating the motion-compensated image sequence, the filtering the motion-compensated image sequence, and the generating the subimage sequence are performed by a signal processor.

2. The method of claim 1 where the image frequency of the motion-compensated image sequence (B(i)) corresponds to n times the frequency of the image sequence (B(z)) to be rendered, n being the number of monochromatic subimages (B1(k), ..., B3(k+1+⅔)) generated in temporal succession in order to render an image (B(k), B(k+1)).

3. The method of claim 1, where in order to render an image (B(k), B(k+1)) of the image sequence (B(z)), three monochromatic subimages (B1(k), ..., B2(k+1+⅔)) in the colors red, green and blue are generated.

4. The method of claim 1, wherein the signal processor includes an interpolator, a filter and a multiplexer.

5. A method for rendering an image sequence in which an image is generated by rendering monochromatic subimages in temporal succession, the method comprising:
   receiving an image sequence and interpolating the received image sequence to generate a motion-compensated received image sequence having an image frequency higher than that of the received image sequence;
   filtering the motion-compensated received image sequence to generate a plurality of monochromatic subimage sequences;
   multiplexing the plurality of monochromatic subimage sequences to generate a subimage sequence; and
   projecting the subimage sequence onto a projection screen;
   where the receiving, interpolating, filtering and multiplexing are performed by a signal processor.

6. The method of claim 5, where the image frequency of the motion-compensated received image sequence corresponds to n times the frequency of the received image sequence, n being equal to the number of plurality of monochromatic subimage sequences.

7. Apparatus that renders an image using a plurality of monochromatic subimages, the apparatus comprising:
   an interpolator that receives an image sequence and generates a motion-compensated received image sequence having an image frequency higher than that of the received image sequence;
   a filter that receives the motion-compensated received image sequence to generate a plurality of monochromatic subimage sequences;
   a multiplexer that receives the plurality of monochromatic subimage sequences and generates a multiplexed subimage sequence; and
   means for projecting the multiplexed subimage sequence onto a projection screen to render the image.

* * * * *